US012105455B2

(12) United States Patent
Yoshikawa et al.

(10) Patent No.: US 12,105,455 B2
(45) Date of Patent: Oct. 1, 2024

(54) SLIDING MEMBER FOR FIXING DEVICE, FIXING DEVICE, AND IMAGE FORMING APPARATUS

(71) Applicant: FUJIFILM Business Innovation Corp., Tokyo (JP)

(72) Inventors: Ryohei Yoshikawa, Kanagawa (JP); Kenji Omori, Kanagawa (JP); Hideaki Ohara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/190,102

(22) Filed: Mar. 26, 2023

(65) Prior Publication Data

US 2024/0027944 A1 Jan. 25, 2024

(30) Foreign Application Priority Data

Jul. 22, 2022 (JP) ................................ 2022-117572

(51) Int. Cl.
*G03G 15/20* (2006.01)

(52) U.S. Cl.
CPC ....... *G03G 15/206* (2013.01); *G03G 15/2064* (2013.01)

(58) Field of Classification Search
None
See application file for complete search history.

(56) References Cited

U.S. PATENT DOCUMENTS

| | | | | |
|---|---|---|---|---|
| 6,456,819 B1 * | 9/2002 | Abe | G03G 15/2064 399/329 |
| 10,365,596 B1 | 7/2019 | Tanaka et al. | |
| 11,131,949 B2 | 9/2021 | Imaizumi | |
| 11,402,774 B2 | 8/2022 | Imaizumi | |
| 2014/0086651 A1 * | 3/2014 | Otsu | G03G 15/2025 428/116 |
| 2014/0205332 A1 * | 7/2014 | Otsu | G03G 15/2053 399/329 |
| 2014/0286684 A1 * | 9/2014 | Takagi | G03G 15/2053 399/329 |
| 2016/0124361 A1 * | 5/2016 | Watanabe | G03G 15/2028 399/323 |
| 2017/0131664 A1 * | 5/2017 | Utsunomiya | G03G 15/2053 |
| 2019/0243293 A1 * | 8/2019 | Tanaka | G03G 15/2053 |
| 2021/0072676 A1 * | 3/2021 | Kawaguchi | G03G 15/2025 |
| 2021/0302908 A1 * | 9/2021 | Ikari | G03G 5/14795 |
| 2022/0326639 A1 | 10/2022 | Imaizumi | |

FOREIGN PATENT DOCUMENTS

| | | |
|---|---|---|
| JP | 2001042670 | 2/2001 |
| JP | 3634679 | 3/2005 |
| JP | 2019135523 | 8/2019 |
| JP | 2021081690 | 5/2021 |

* cited by examiner

*Primary Examiner* — Sevan A Aydin
(74) *Attorney, Agent, or Firm* — JCIPRNET

(57) ABSTRACT

A sliding member for a fixing device includes a resin layer that includes plural recessed portions on a surface of the resin layer, in which, in a top view, the recessed portion has a shape having a tip angle less than 90° in a sliding direction and an area ratio of an area of the recessed portions to a surface area of the resin layer is 30% or more and 70% or less.

20 Claims, 8 Drawing Sheets

SLIDING MEMBER FOR FIXING DEVICE, FIXING DEVICE, AND IMAGE FORMING APPARATUS

CROSS-REFERENCE TO RELATED APPLICATIONS

This application is based on and claims priority under 35 USC 119 from Japanese Patent Application No. 2022-117572 filed Jul. 22, 2022.

BACKGROUND

(i) Technical Field

The present invention relates to a sliding member for a fixing device, a fixing device, and an image forming apparatus.

(ii) Related Art

For example, JP2021-81690A discloses a fixing device including a fixing film, a heater that heats the fixing film, a heater holder that includes a heater holding part holding the heater, and a pressure roller that forms a nip portion between the heater and the pressure roller with the fixing film interposed between the heater and the pressure roller, and the fixing device fixes an unfixed toner image supported on a recording material at the nip portion. The heater holder includes a facing surface that faces the pressure roller provided on an upstream side of the heater holding part in a transport direction of the recording material, a lubricant holding portion that is provided on the facing surface and supplies a lubricant between the fixing film and the heater, and a protruding portion that is provided on an upstream side of the lubricant holding portion in the transport direction and protrudes toward the pressure roller as compared to the facing surface.

For example, JP2001-42670A discloses a heating device including a second member that slides and moves with respect to a first member and a third member that is in contact with the first member with the second member interposed between the first member and the third member. The heating device sandwiches and transports a material to be heated at a contact portion, which is formed in a case where the second member and the third member are in contact with each other, to press and heat the material to be heated. The heating device, which includes a plurality of independent recessed portions provided at a second member-sliding portion of the first member corresponding to a contact portion formed in a case where the second member and the third member are in contact with each other, is used as a fixing unit of an image forming apparatus.

For example, JP2019-135523A discloses a fixing device including a heater, a rotating member that is heated by the heater, an endless belt of which an inner peripheral surface is coated with a lubricant, a nip forming member that forms a nip portion between the rotating member and the nip forming member with the endless belt interposed between the rotating member and the nip forming member, and a sliding sheet that is interposed between an inner peripheral surface of the endless belt and the nip forming member at the nip portion. The sliding sheet includes a plurality of first recessed portions and a plurality of second recessed portions in a nip region, which corresponds to the nip portion, on a surface in contact with the inner peripheral surface of the endless belt. The first recessed portions are arranged at a first portion of the nip region to which first nip pressure is applied, the second recessed portions are arranged at a second portion of the nip region to which second nip pressure lower than the first nip pressure is applied, and the first recessed portion has a shape that allows the lubricant to more easily flow out in a sliding direction of the endless belt with respect to the sliding sheet than the second recessed portion.

SUMMARY

Aspects of non-limiting embodiments of the present disclosure relate to a sliding member for a fixing device that includes a resin layer including a plurality of recessed portions on a surface of the resin layer, and is excellent in sliding resistance maintainability as compared to a case where the recessed portion has a shape having a tip angle of 90° or more in a sliding direction or an area ratio of an area of the recessed portions to a surface area of the resin layer exceeds 70% in a top view.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

The aspects are achieved by the following means.

According to an aspect of the present disclosure, there is provided a sliding member for a fixing device including a resin layer that includes a plurality of recessed portions on a surface of the resin layer, in which, in a top view, the recessed portion has a shape having a tip angle less than 90° in a sliding direction and an area ratio of an area of the recessed portions to a surface area of the resin layer is 30% or more and 70% or less.

BRIEF DESCRIPTION OF THE DRAWINGS

Exemplary embodiment(s) of the present invention will be described in detail based on the following figures, wherein.

Figure 4:
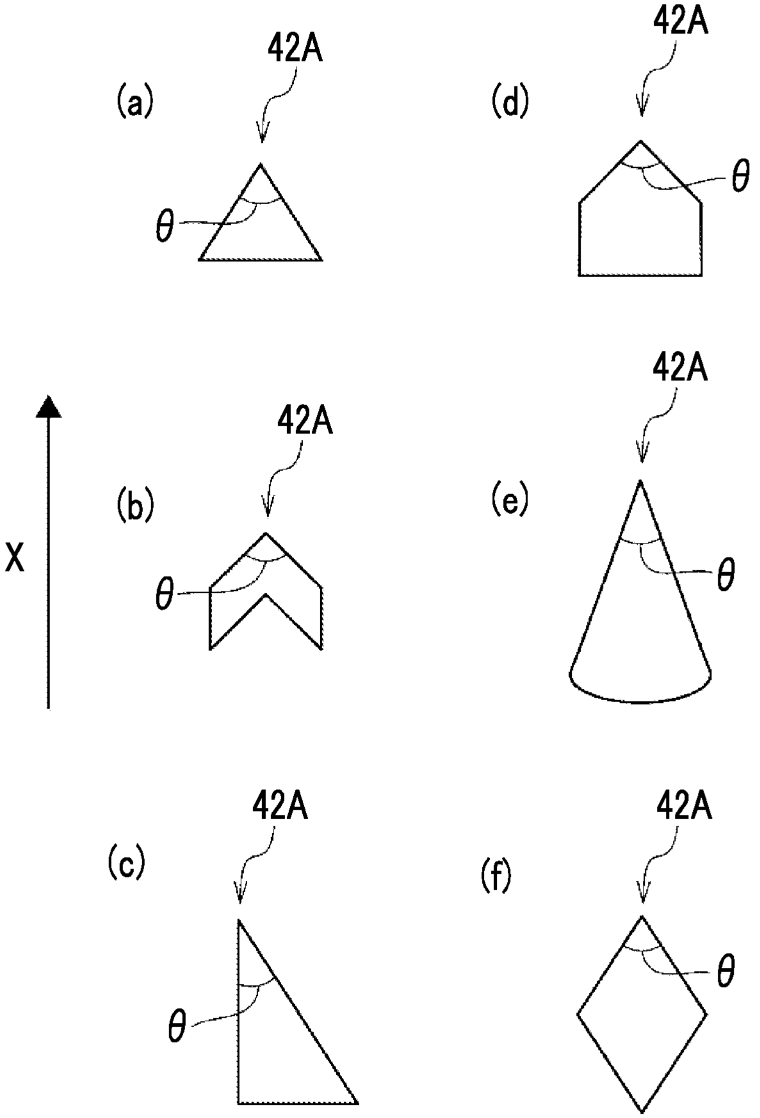
Figure 5:
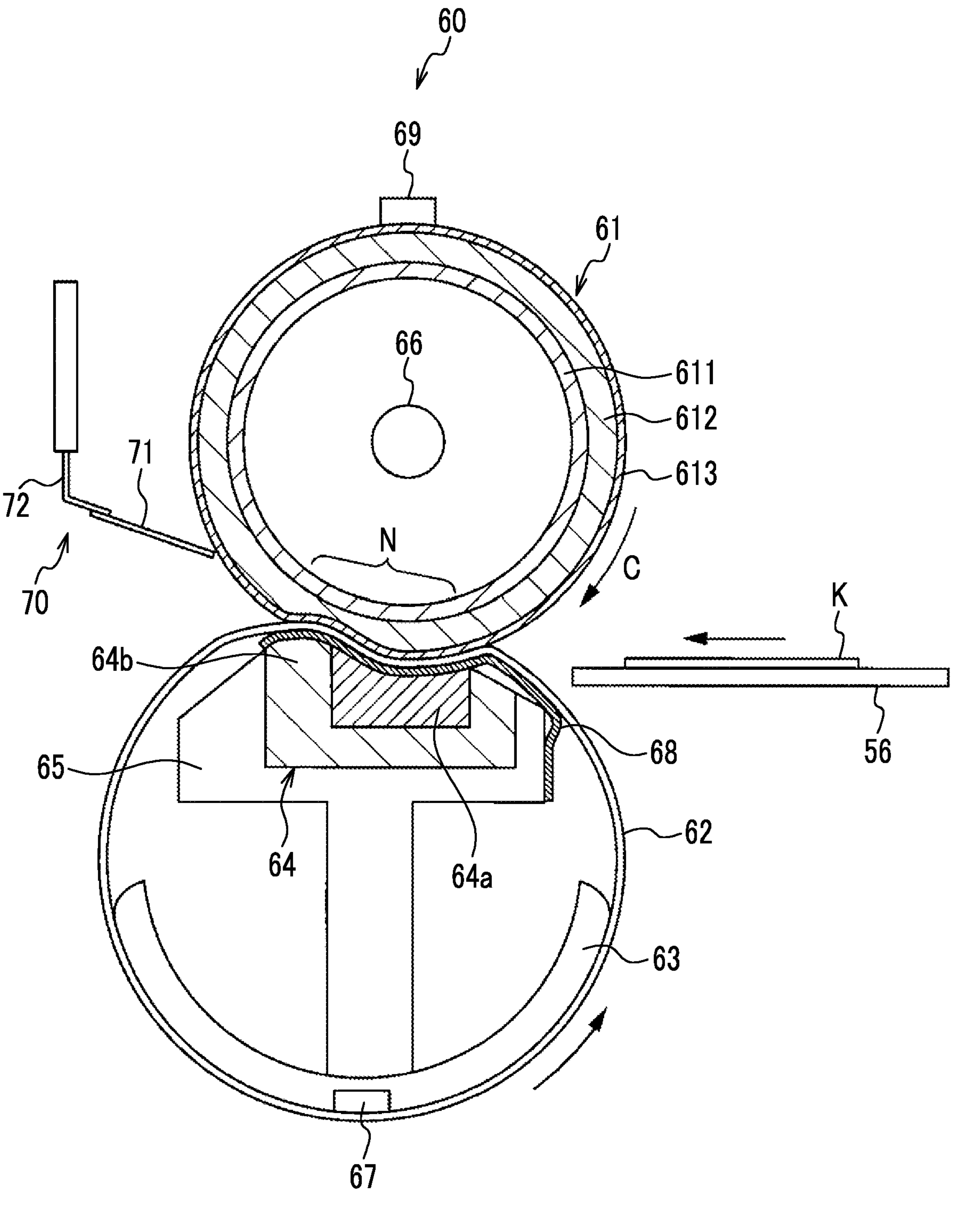
Figure 6:
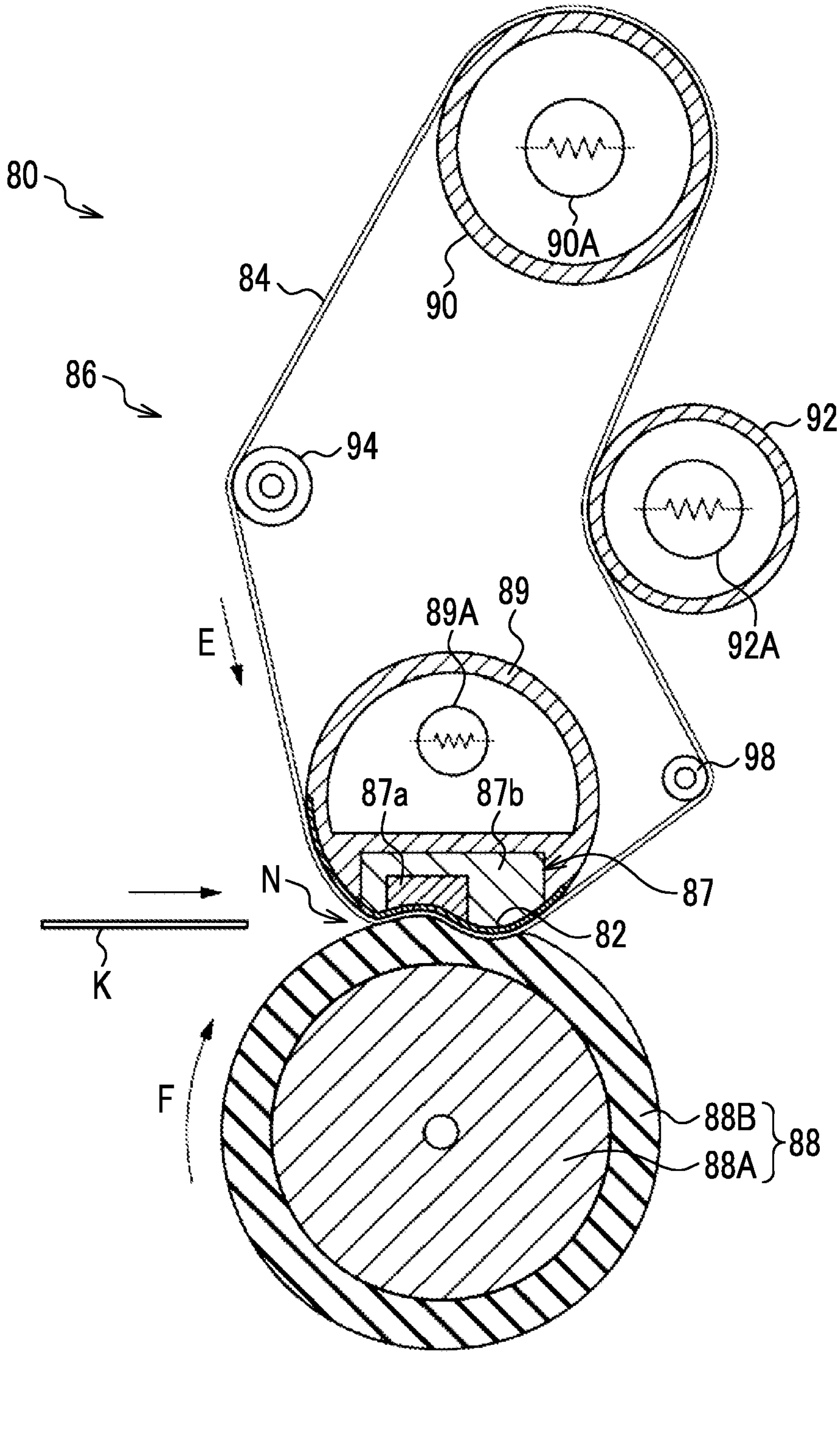
Figure 7:
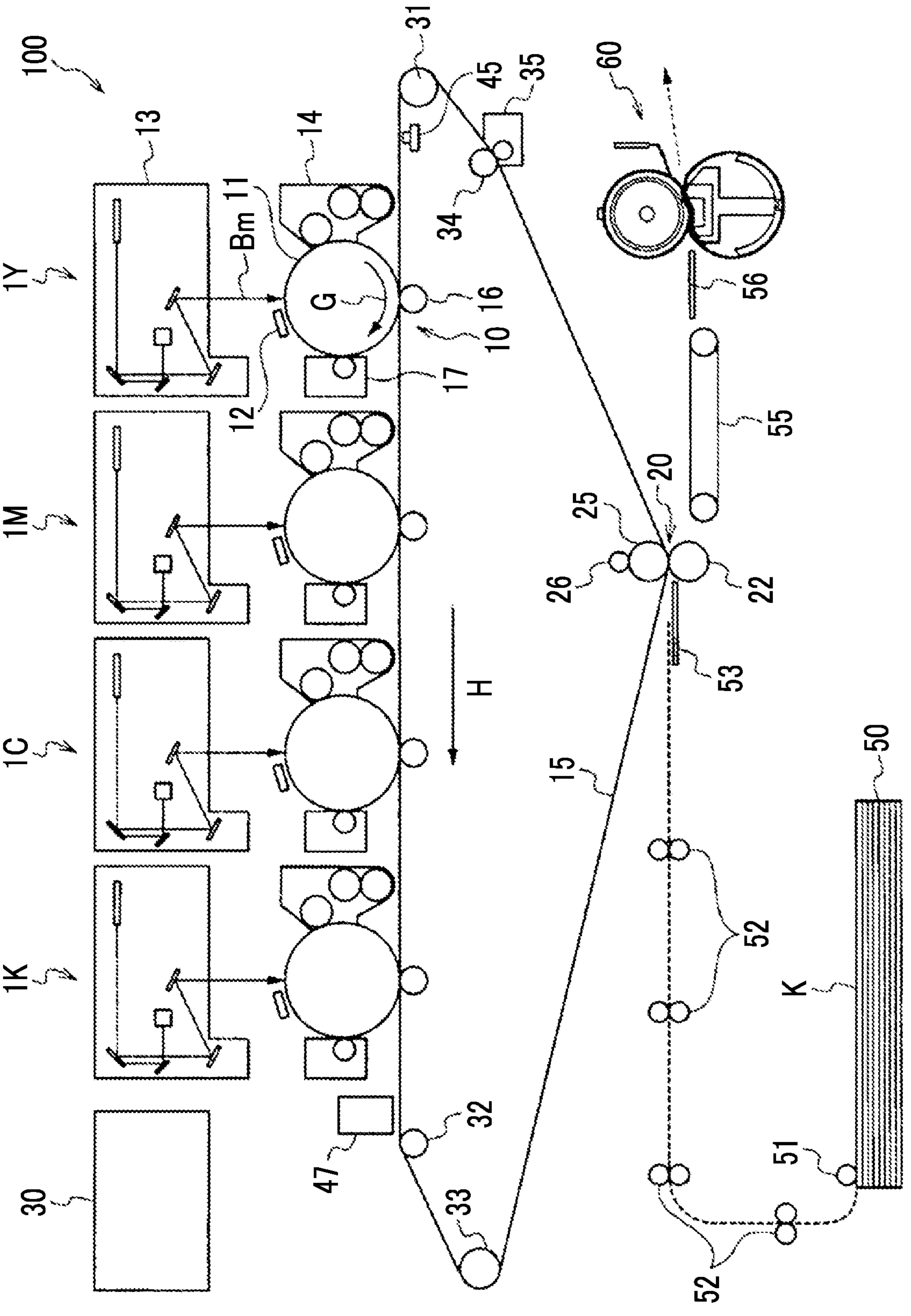
Figure 8:
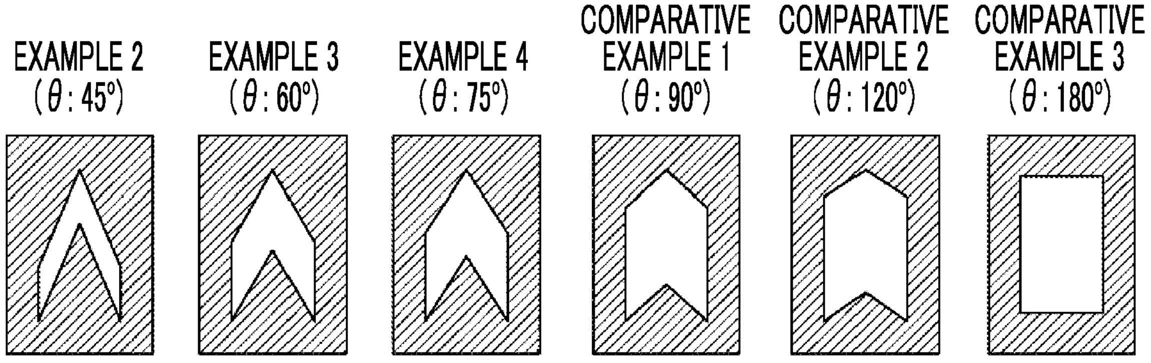

Parts (a), (b), (c), (d), (e), and (f) in FIG. 4 are schematic diagrams showing examples of the shape of a recessed portion formed on the surface of a resin layer;

FIG. 5 is a schematic diagram showing one configuration example of a fixing device according to the present exemplary embodiment;

FIG. 6 is a schematic diagram showing another configuration example of the fixing device according to the present exemplary embodiment;

FIG. 7 is a schematic diagram showing a configuration example of an image forming apparatus according to the present exemplary embodiment; and FIG. 8 is a schematic diagram showing shapes and tip angles of recessed portions formed on sliding sheets of Examples and Comparative Examples.

DETAILED DESCRIPTION

Exemplary embodiments will be described below. The description and examples illustrate the exemplary embodiments and do not limit the scopes of the exemplary embodiments.

With regard to numerical ranges described stepwise in the present exemplary embodiment, an upper limit or a lower limit described in one numerical range may be replaced with an upper limit or a lower limit of another numerical range described stepwise. Further, with regard to a numerical range described in the present exemplary embodiment, the upper limit or the lower limit of the numerical range may be replaced with values shown in Examples.

In the present exemplary embodiment, the term "step" includes not only an independent step but also a case where the intended purpose of the step is achieved even in a case where the step cannot be clearly distinguished from another step.

In the case where the exemplary embodiment is described with reference to the drawings in the present exemplary embodiment, the configuration of the exemplary embodiment is not limited to the configuration shown in the drawings. In addition, the sizes of members in each drawing are conceptual, and a relative relationship between the sizes of the members is not limited thereto.

In the present exemplary embodiment, each component may include a plurality of types of corresponding substances. In the case where the amount of each component contained in a composition is mentioned in the present exemplary embodiment and a plurality of types of substances corresponding to each component are present in the composition, the amount of each component means a total amount of the plurality of types of substances present in the composition unless otherwise specified.

Sliding Member for Fixing Device

A sliding member for a fixing device according to the present exemplary embodiment includes a resin layer that includes a plurality of recessed portions on a surface of the resin layer. In a top view, the recessed portion has a shape having a tip angle less than 90° in a sliding direction and an area ratio of an area of the recessed portions to a surface area of the resin layer is 30% or more and 70% or less.

Hereinafter, the sliding member for a fixing device is also simply referred to as a "sliding member".

Further, the surface of the resin layer including the plurality of recessed portions forms a sliding surface.

A sliding member for a fixing device includes a first rotating body, a second rotating body that is disposed in contact with an outer surface of the first rotating body, and a pressing member that is disposed in the second rotating body and presses the second rotating body against the first rotating body from an inner surface of the second rotating body. The sliding member for a fixing device is used while being interposed between the inner surface of the second rotating body and the pressing member. Further, in a case where a lubricant is interposed between the inner surface of the second rotating body and the sliding member for a fixing device, sliding resistance between the inner surface of the second rotating body and the sliding member for a fixing device is reduced and the drive torque of the second rotating body is reduced.

However, since a film formed by the lubricant is often discontinuous even in a case where the lubricant is interposed as described above, a region where the inner surface of the second rotating body and the sliding member for a fixing device is in direct contact with each other is formed. For this reason, a friction coefficient in that region is increased, and it is difficult to maintain low sliding resistance in a case where the second rotating body continues to be rotated.

On the other hand, the sliding member for a fixing device according to the present exemplary embodiment includes the resin layer that includes a plurality of recessed portions on a surface of the resin layer forming a surface (that is, the sliding surface) facing the inner surface of the second rotating body. Further, in the sliding member for a fixing device according to the present exemplary embodiment, in a top view, the recessed portion has a shape having a tip angle less than 90° in a sliding direction and an area ratio of an area of the recessed portions to a surface area of the resin layer is 30% or more and 70% or less. In a case where the surface of the resin layer forming the sliding surface includes the recessed portions having a shape having a tip angle less than 90° in a sliding direction, the lubricant is caught by the recessed portions and the lubricant caught at the recessed portions is sent toward the tip angles of the recessed portions with sliding. Since the tip angle of the recessed portion is an acute angle, it is presumed that the lubricant is effectively accumulated near the tip angle and the lubricant accumulated near the tip angle causes lift for pushing up the inner surface of the second rotating body. Further, since the recessed portions are present with the above-mentioned area ratio, it is presumed that an appropriate region of the inner surface of the second rotating body can be pushed up. As a result, in a case where the sliding member for a fixing device according to the present exemplary embodiment is used, an action of pushing up the inner surface of the second rotating body is added in addition to a reduction in sliding resistance caused by the lubricant. Accordingly, it is possible to suppress an increase in friction coefficient in a region where the inner surface of the second rotating body and the sliding member for a fixing device is in direct contact with each other, and to maintain low sliding resistance. That is, the sliding member for a fixing device according to the present exemplary embodiment is excellent in sliding resistance maintainability.

Sliding members according to the present exemplary embodiments will be described in detail below with reference to the drawings.

The shape of the sliding member according to the present exemplary embodiment is not particularly limited, and is appropriately selected as desired. It is preferable that, for example, the sliding member has a sheet shape, that is, is a sliding sheet.

The sliding member according to the present exemplary embodiment may be a sliding member having a monolayer structure or a sliding member including two or more layers, and includes at least a resin layer that includes a plurality of recessed portions on the surface of the resin layer.

Recessed Portion

Figure 1:
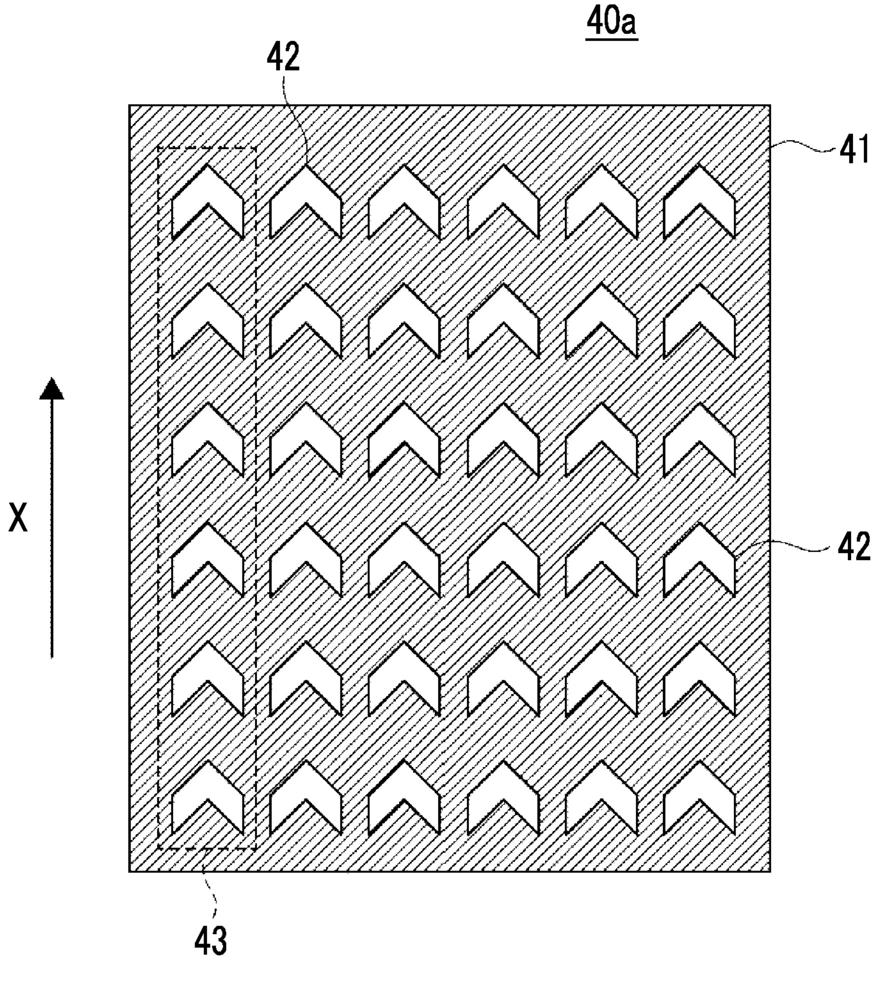
FIG. 1 is a schematic diagram showing a surface (that is, a sliding surface) of a sliding member for a fixing device according to an exemplary embodiment in a top view.
Figure 2:
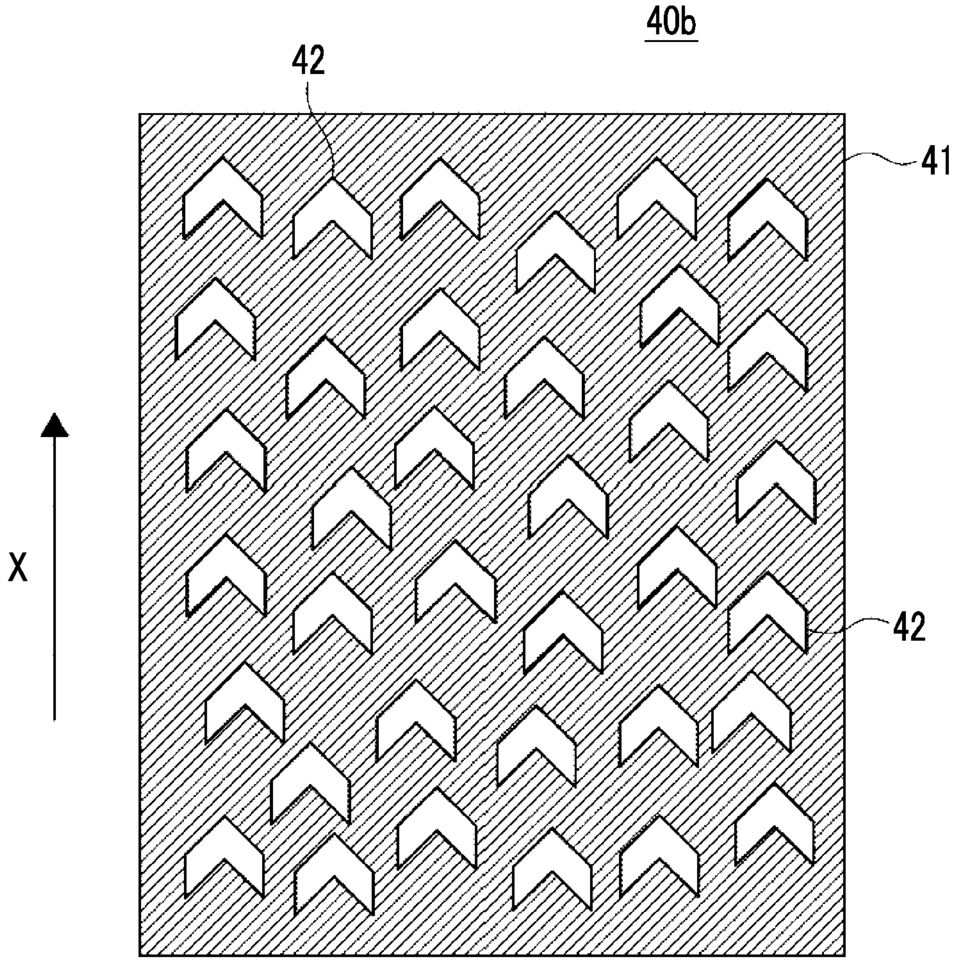
FIG. 2 is a schematic diagram showing a surface (that is, the sliding surface) of a sliding member for a fixing device according to an exemplary embodiment in a top view.
Figure 3:
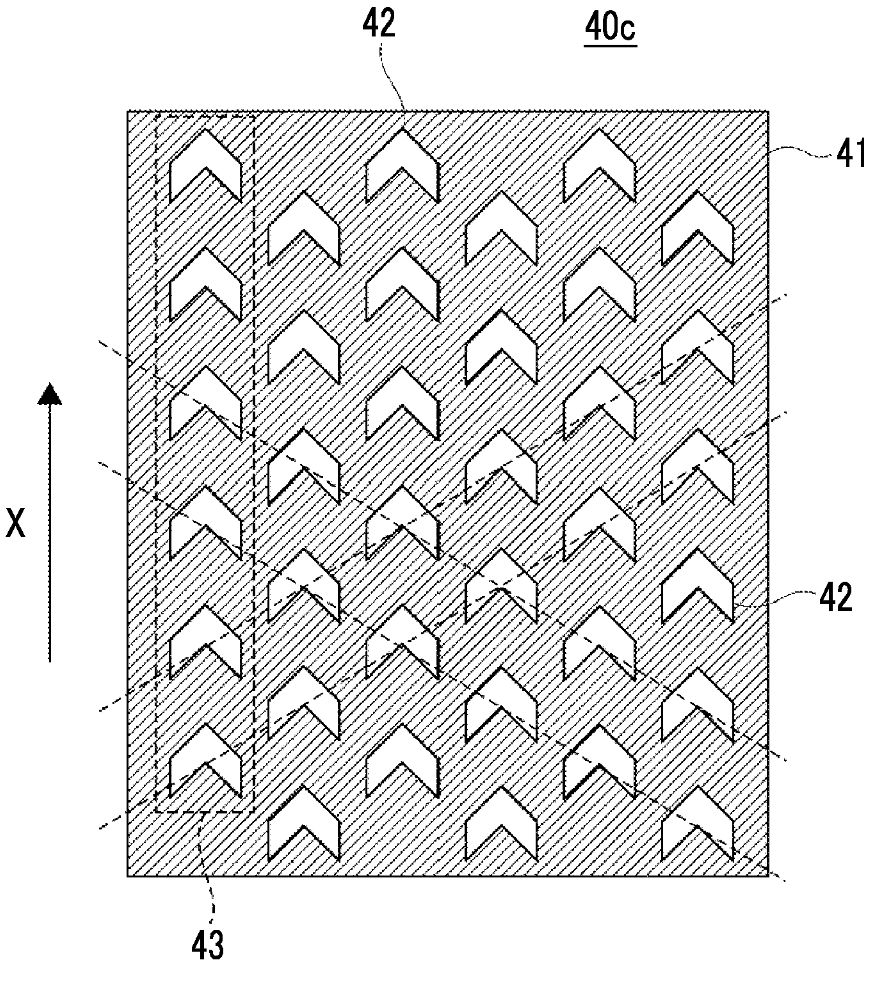
FIG. 3 is a schematic diagram showing a surface (that is, the sliding surface) of a sliding member for a fixing device according to an exemplary embodiment in a top view.

FIGS. 1 to 3 are schematic diagrams showing surfaces (that is, sliding surfaces) of the sliding members according to the present exemplary embodiments in a top view.

Each of the sliding members 40*a* to 40*c* shown in FIGS. 1 to 3 includes a plurality of recessed portions 42 on the surface (that is, the sliding surface) of a resin layer 41. The sliding members 40*a* to 40*c* have different arrangements of the plurality of recessed portions 42. In FIGS. 1 to 3, a direction of an arrow X is a sliding direction.

In the sliding member 40*a* shown in FIG. 1, a group 43 is formed of six recessed portions 42 having an identical shape and linearly arranged in a sliding direction indicated by an arrow X as in a region surrounded by a dotted line, and the groups 43 are arranged in parallel in six rows in a direction orthogonal to the arrow X. As described above, the recessed portions 42 of the sliding member 40*a* are arranged periodically.

In the sliding member 40*b* shown in FIG. 2, all recessed portions 42 having the identical shape are present aperiodically. That is, the recessed portions 42 of the sliding member 40*b* are present in a state where the recessed portions 42 do not have periodicity.

In the sliding member 40*c* shown in FIG. 3, all recessed portions 42 having the identical shape are arranged in a grid pattern. Even in case of this arrangement, a group 43 is formed of six recessed portions 42 linearly arranged in a sliding direction indicated by an arrow X, and the groups 43 are arranged in six rows in a direction orthogonal to the arrow X. As described above, the recessed portions 42 of the sliding member 40*c* are also arranged periodically.

As described above, the plurality of recessed portions may be scattered on the surface of the resin layer in a periodic arrangement or may be aperiodically scattered on the surface of the resin layer.

The arrangement of the recessed portions on the surface of the resin layer may be transferred to a fixed image as a local difference in glossiness. In a case where the plurality of recessed portions are arranged periodically, particularly, at least some recessed portions among all the recessed portions present on the surface of the resin layer are linearly arranged in the sliding direction and the arrangement of the recessed portions is transferred as a local difference in glossiness in a fixed image, the local difference in glossiness tends to be likely to be visually recognized as so-called gloss unevenness.

It is found that, in a case where portions where there is a local difference in glossiness are present aperiodically even though there is the local difference in glossiness in an image, it is difficult to visually recognize the local difference in glossiness. For this reason, from the viewpoint of making it difficult to visually recognize gloss unevenness in an image, it is preferable that, for example, the arrangement of the recessed portions on the surface of the resin layer is aperiodic.

Here, with regard to the arrangement of the plurality of recessed portions, "aperiodic" means that the arrangement of the plurality of recessed portions is irregular and means that a distance between adjacent recessed portions is not regular.

The periodic arrangement of the plurality of recessed portions is not particularly limited to the aspects shown in FIGS. 1 and 3. Examples of the periodic arrangement of the plurality of recessed portions include an arrangement pattern with a grid and a face-centered grid as a unit. The grid may have any one of a square shape, a rectangular shape, a rhombic shape, or a parallelogram shape. The face-centered grid means a structure that has a total of five points, that is, the vertices of a parallelogram and an intersection of the diagonal lines of the parallelogram as grid points of a unit grid.

Shape of Recessed Portion

In a top view of the surface of the sliding member according to the present exemplary embodiment, the recessed portion has a shape having a tip angle less than 90° in a sliding direction.

For example, as long as the recessed portion has a tip angle 42A that is represented by 0 and less than 90° in the sliding direction indicated by the arrow X as in shapes shown in parts (a) to (f) in FIG. 4, other shapes are not limited. That is, the recessed portion may have a triangular shape as shown in the parts (a) and (c) in FIG. 4, may have a quadrangular shape as shown in the part (f) in FIG. 4, may have a polygonal shape of which the number of sides is equal to or larger than the number of sides of a pentagonal shape as shown in the parts (b) and (d) in FIG. 4, or may have a fan shape as shown in the part (e) in FIG. 4.

The plurality of recessed portions scattered on the surface of the resin layer may have only one type of shape or may have a plurality of shapes. Further, the plurality of recessed portions scattered on the surface of the resin layer have only one type of shape or may include recessed portions having different sizes.

Tip Angle

From the viewpoint of improving sliding resistance maintainability, the tip angle (θ shown in the parts (a) to (f) in FIG. 4) of the recessed portion is, for example, preferably 80° or less and more preferably 75° or less.

Further, from the viewpoint of the ease of manufacture, the tip angle of the recessed portion is, for example, preferably 40° or more and more preferably 45° or more.

That is, the tip angle of the recessed portion is, for example, preferably 40° or more and 80° or less and more preferably 45° or more and 75° or less.

Area Ratio

In a top view of the surface of the sliding member according to the present exemplary embodiment, an area ratio of the area of the recessed portions to the surface area of the resin layer is, for example, 30% or more and 70% or less, preferably 50% or more and 70% or less, and more preferably 60% or more and 65% or less.

The area ratio indicates a ratio of the sum of the areas of the plurality of recessed portions, which are obtained in a top view of the sliding member, to the area of the resin layer.

In a case where the plurality of recessed portions are present at the above-mentioned area ratio, excellent sliding resistance maintainability is obtained from the sliding member according to the present exemplary embodiment.

Depth of Recessed Portion

From the viewpoint of facilitating the accumulation of a lubricant and improving sliding resistance maintainability, the depth of each of the recessed portions scattered on the surface of the resin layer is, for example, preferably 15 μm or more, more preferably 20 μm or more, and still more preferably 25 μm or more, in terms of the maximum depth.

An upper limit of the depth of the recessed portion may be equal to or less than the thickness of the resin layer. For example, the upper limit of the depth of the recessed portion is less than a thickness less than the thickness of the resin layer and is 50 μm.

Examples of the shape of the recessed portion in a depth direction include a columnar shape, a conical shape, a tapered shape, a reverse-tapered shape, and the like.

Size of Recessed Portion

From the viewpoint of improving sliding resistance maintainability, the size of each of the recessed portions scattered on the surface of the resin layer is, for example, preferably 100 μm or more and 400 μm or less, more preferably 150 μm or more and 350 μm or less, and still more preferably 200 μm or more and 300 μm or less, in terms of the maximum diameter.

Further, from the viewpoint of improving sliding resistance maintainability, the size of each of the recessed portions scattered on the surface of the resin layer is, for example, preferably 3000 μm 2 or more and 75000 μm 2 or less, more preferably 10000 μm 2 or more and 60000 μm 2 or less, and still more preferably 30000 μm 2 or more and 50000 μm 2 or less, in terms of an area per piece.

Number of Recessed Portions

Furthermore, the number of the recessed portions scattered on the surface of the resin layer may be appropriately determined according to the size of the recessed portion the area ratio described above.

Aspect

From the viewpoint of improving sliding resistance maintainability, it is preferable that, for example, the tip angle is 40° or more and 80° or less and the depth of the recessed portion is 15 μm or more in the sliding member according to the present exemplary embodiment.

Further, from the viewpoint of improving sliding resistance maintainability, it is also preferable that, for example, the tip angle is 40° or more and 80° or less and the area ratio is 50% or more and 70% or less in the sliding member according to the present exemplary embodiment.

Furthermore, from the viewpoint of improving sliding resistance maintainability, it is also preferable that, for example, the depth of the recessed portion is 15 μm or more and the area ratio is 50% or more and 70% or less in the sliding member according to the present exemplary embodiment.

The tip angle of the recessed portion, the area ratio of the recessed portions, an area per recessed portion, the size of the recessed portion, and the number of recessed portions are obtained as follows.

The observation images of five portions on the sliding surface of the sliding member are obtained with a laser microscope (Keyence Corporation, model number: VK-9700, condition: three-dimensional shape measurement mode), and an average value of numerical values calculated by the following method is obtained on the basis of the obtained observation images.

The tip angle of the recessed portion, the area ratio of the recessed portions, and an area per recessed portion are measured with binarization processing for a height color map. Image processing software ImageJ is used in the binarization processing to set a value lower than the average height of a flat portion by 0.5 μm as a threshold value.

Further, the size of the recessed portion is automatically calculated by attached software VK Viewer of the laser microscope.

The number of recessed portions is calculated from the area of the sliding member, the area ratio of the recessed portions, and an area per recessed portion.

The depth of the recessed portion is obtained as follows.

"The depth of the recessed portion" is obtained from a roughness curve that is obtained in a case where five portions on the sliding surface of the sliding member are observed with a laser microscope (Keyence Corporation, model number: VK-9700, condition: three-dimensional shape measurement mode). Specifically, a difference between the average height of a flat portion and a height at the lowest position of the recessed portion in the thickness direction of the sliding member is calculated, and an average value of the depths of the five portions is obtained and is defined as the depth of the recessed portion.

Resin Layer

The sliding member according to the present exemplary embodiment includes the resin layer.

Examples of a resin contained in the resin layer include a polyimide resin, a polyamide resin, a polyamide imide resin, an aromatic polyether ketone resin, a polyether ester resin, a polyarylate resin, a polyester resin, a polyphenylene sulfide resin, a silicone resin, a fluororesin, and the like.

Further, one type of resin may be used alone, or two or more types of resins may be used together.

A part (for example, a silicone resin and the like) of these resins may be contained in the resin layer as resin particles. For example, resin particles made of a silicone resin function as a slip agent.

The content of the resin in the resin layer is preferably, for example, 80% by mass or more, more preferably 90% by mass or more, and still more preferably 95% by mass or more, and may be 100% by mass with respect to the total mass of the resin layer.

Additive

The resin layer may be formed of only the above-mentioned resin, and may contain additives other than the resin.

Examples of the additives include a filler, such as inorganic particles.

The filler is a component that is added to the resin layer for the purpose of imparting conductivity and thermal conductivity and improving durability.

Examples of the filler include particles of metal or metal oxide, particles of a silicate mineral, carbon black, and a nitrogen compound, and the like.

Among particles of metal or metal oxide, particles of a silicate mineral, carbon black, and a nitrogen compound, and the like, carbon black (specifically, ketjen black, acetylene black, or the like) is desirable to impart, for example, conductivity. Copper, silver, aluminum nitride, boron nitride, alumina, and the like are desirable to impart, for example, thermal conductivity.

One type of filler may be used, or two or more types of fillers may be used.

It is desirable that the average particle diameter of the filler is, for example, 0.01 μm or more and 20 μm or less.

In a case where the filler is used, it is preferable that the content of the filler is, for example, 0.01 parts by mass or more 30 parts by mass or less with respect to 100 parts by mass of the resin.

Thickness

The thickness of the resin layer may be appropriately set according to the stiffness of the resin layer, the presence or absence of a substrate to be described later, the stiffness of the substrate, and the like. The thickness of the resin layer is, for example, 20 μm or more and 500 μm or less and preferably 50 μm or more and 400 μm or less.

In a case where the sliding member according to the present exemplary embodiment does not include a substrate, the thickness of the resin layer is, for example, preferably 200 μm or more and 400 μm or less from the viewpoint of a shape retention property, durability, and the like.

Method of Forming Recessed Portion in Resin Layer

Examples of a method of forming the recessed portions on the resin layer include a method including preparing a mold that includes protruding portions on a pressing surface to be pressed against a sheet-like resin layer, pressing the mold against the sheet-like resin layer (for example, a fluororesin layer), and heating the mold up to a temperature equal to or higher than a glass transition temperature of a resin to form recessed portions corresponding to the protruding portions of the mold, that is, so-called hot press.

Substrate

The sliding member according to the present exemplary embodiment may include a substrate.

In a case where the sliding member according to the present exemplary embodiment includes a substrate, the sliding member includes the above-mentioned resin layer on the surface of at least a part of the substrate.

The shape of the substrate is not particularly limited, may be a desired shape, and is, for example, preferably a sheet shape.

The material of the substrate is not particularly limited, and a substrate made of a publicly known material is used.

Examples of the substrate include a resin substrate, woven fabric, nonwoven fabric, and the like.

Examples of the resin include a polyimide resin, a polyamide resin, a polyamide imide resin, a polyether ester resin, a polyarylate resin, a polyester resin, and the like.

Examples of fiber used for the woven fabric and the nonwoven fabric include plastic fiber, natural fiber, glass cloth, and the like. Among plastic fiber, natural fiber, glass cloth, and the like, for example, glass cloth is preferable.

In a case where the substrate has a sheet shape, the thickness of the substrate is not particularly limited but is, for example, preferably 5 μm or more and 500 μm or less, more preferably 8 μm or more and 300 μm or less, still more preferably 10 μm or more and 200 μm or less, and particularly preferably 13 μm or more and 100 μm or less.

Adhesive Layer

Further, the sliding member according to the present exemplary embodiment may include an adhesive layer.

In a case where the sliding member has a structure in which layers are laminated in a thickness direction, an adhesive layer for adhering one layer to another layer may be present between the respective layers.

The adhesive layer may be a layer made of a publicly known adhesive, such as a heat-resistant silicone resin or an epoxy-based resin, may be fusion-welded with fluororesin dispersion liquid, or may be a layer formed of an adhesive sheet.

For example, adhesive sheets that cause thermal fusion welding by being heated to a temperature equal to or higher than a melting point and adhere each of the laminated layers are preferably used as the adhesive sheet. Among the adhesive sheets, for example, a fluorine-based adhesive sheet is preferably used. Specifically, trade name "SILKY BOND" (manufactured by Junkosha Co., Ltd.) is used.

The thickness of the adhesive sheet is not particularly limited and is, for example, preferably 10 μm or more and 30 μm or less.

Method of Manufacturing Sliding Member

A method of manufacturing the sliding member according to the present exemplary embodiment is not particularly limited, and examples of the method of manufacturing the sliding member includes a method of bonding a resin layer, which includes recessed portions formed as described above, to a substrate.

Fixing Device

A fixing device according to the present exemplary embodiment includes a first rotating body, a second rotating body that is disposed in contact with an outer surface of the first rotating body, a pressing member that is disposed in the second rotating body and presses the second rotating body against the first rotating body from an inner surface of the second rotating body, a sliding member for a fixing device that is interposed between the inner surface of the second rotating body and the pressing member, and a lubricant that is interposed between an inner periphery of the second rotating body and the sliding member for a fixing device. A recording medium in which a toner image is formed on the surface is inserted into a contact portion between the first rotating body and the second rotating body and the toner image is fixed. Here, the above-mentioned sliding member according to the present exemplary embodiment is used as the sliding member for a fixing device.

It is preferable that, for example, the fixing device according to the present exemplary embodiment further includes a heating source heating at least one of the first rotating body or the second rotating body.

A surface roughness Ra of an inner surface (inner peripheral surface) of a heating belt or a pressure belt as an example of the second rotating body is, for example, preferably 0.1 μm or more and 2.0 μm or less and more preferably 0.3 μm or more and 1.5 μm or less. In a case where the surface roughness Ra is in the above-mentioned range, sliding resistance between the heating belt or the pressure belt as an example of the second rotating body and the sliding member is reduced and a lubricant is likely to be held between the second rotating body and the sliding member. Accordingly, the abrasion resistance of the sliding member is improved.

Here, the surface roughness Ra is measured in accordance with JIS B 0601:1994 using a surface roughness tester SURFCOM 1400A (manufactured by Tokyo Seimitsu Co., Ltd.) under measurement conditions where an evaluation length Ln is set to 4 mm, a reference length L is set to 0.8 mm, and a cutoff value is set to 0.8 mm.

Further, a lubricant is interposed between the inner periphery of the second rotating body and the sliding member for a fixing device in the fixing device according to the present exemplary embodiment, and the viscosity of this lubricant at a temperature of 150° C. is, for example, preferably 1 $mm^2/s$ or more and 100 $mm^2/s$ or less and more preferably 30 $mm^2/s$ or more and 70 $mm^2/s$ or less.

The lubricant of which the viscosity is in the range has high fluidity, and sliding resistance maintainability can be further improved in a case where the sliding member according to the present exemplary embodiment is applied as the sliding member for a fixing device.

Although there are various configurations of the fixing device according to the present exemplary embodiment, the following two exemplary embodiments will be specifically described.

A fixing device including a heating roller that includes a heating source and a pressure belt against which a pressing pad is pressed will be described as a first exemplary embodiment.

A fixing device including a heating belt which includes a heating source and against which a pressing pad is pressed and a pressure roller will be described as a second exemplary embodiment.

The sliding member according to the present exemplary embodiment is applied as sheet-like sliding members of these fixing devices.

Fixing Device According to First Exemplary Embodiment

A fixing device 60 according to the first exemplary embodiment will be described with reference to FIG. 5.

FIG. 5 is a schematic diagram showing the configuration of the fixing device 60 according to the first exemplary embodiment.

The fixing device 60 includes a heating roller 61 (an example of the first rotating body), a pressure belt 62 (an example of the second rotating body), a pressing pad 64 (an example of the pressing member), a sliding member 68 (an example of the sliding member according to the present exemplary embodiment), and a halogen lamp 66 (an example of the heating source).

The heating roller 61 and the pressure belt 62 are in contact with each other at outer peripheral surfaces and apply pressure to each other. The pressure belt 62 may be pressed against the heating roller 61, or the heating roller 61 may be pressed against the pressure belt 62. A nip region N (nip portion) is formed in a region where the heating roller 61 and the pressure belt 62 are in contact with each other.

The heating roller 61 includes the halogen lamp 66 (an example of the heating source) therein. The heating source is not limited to the halogen lamp and may be other heat generating members that generate heat.

A temperature-sensitive element 69 is disposed in contact with the outer peripheral surface of the heating roller 61. The lighting of the halogen lamp 66 is controlled on the basis of a temperature value measured by the temperature-sensitive element 69, so that the surface temperature of the heating roller 61 is maintained at a set temperature (for example, at a temperature of 150° C.).

The heating roller 61 has a configuration in which a heat-resistant elastic body layer 612 and a release layer 613 are laminated in this order around a core (cylindrical core metal) 611 made of, for example, metal.

The pressure belt 62 is disposed in contact with the outer peripheral surface of the heating roller 61.

The pressure belt 62 is rotatably supported by the pressing pad 64 and a belt traveling guide 63 that are disposed in the pressure belt 62.

The pressing pad 64 is disposed inside the pressure belt 62 and applies pressure to the heating roller 61 via the pressure belt 62.

The pressing pad 64 includes a front nip member 64*a* disposed on an entrance side of the nip region N and includes a peeling nip member 64*b* disposed on an exit side of the nip region N.

The front nip member 64*a* is formed in a concave shape corresponding to the outer peripheral shape of the heating roller 61 and ensures the length (a distance in the sliding direction) of the nip region N.

The peeling nip member 64*b* is formed to protrude toward the outer peripheral surface of the heating roller 61, and causes local strain on the heating roller 61 in an exit region of the nip region N to facilitate the peeling of a recording medium to which an image is fixed from the heating roller 61.

The sliding member 68 is formed in a sheet shape, and is disposed between the pressure belt 62 and the pressing pad 64 such that the sliding surface (a surface on which the recessed portions are scattered) of the sliding member 68 is in contact with the inner peripheral surface of the pressure belt 62.

The sliding member 68 is involved in holding and providing a lubricant (that is, oil) present between the sliding surface of the sliding member 68 and the inner peripheral surface of the pressure belt 62, and is also involved in pushing up the inner surface of the pressure belt 62 in a case where the sliding member according to the present exemplary embodiment is applied. Since the sliding member 68 is excellent in sliding resistance maintainability, an increase in the life of the fixing device 60 is achieved.

The sliding member 68 is disposed to cover the front nip member 64*a* and the peeling nip member 64*b* so that sliding resistance between the inner peripheral surface of the pressure belt 62 and the pressing pad 64 is reduced.

A holding member 65 holds the pressing pad 64 and the sliding member 68. The holding member 65 is made of, for example, metal.

The belt traveling guide 63 is mounted on the holding member 65. The pressure belt 62 is rotated along the belt traveling guide 63.

A lubricant supply device 67, which is means for supplying a lubricant (for example, oil) to the inner peripheral surface of the pressure belt 62, is mounted on the belt traveling guide 63.

A peeling member 70 as auxiliary means for peeling off a recording medium is provided on the downstream side of the nip region N. The peeling member 70 includes a peeling claw 71 and a holding member 72 that holds the peeling claw 71. The peeling claw 71 is disposed in a state where the peeling claw 71 is close to the heating roller 61 in a direction (counter direction) opposite to the rotation direction of the heating roller 61.

The heating roller 61 is rotated in a direction of an arrow C by a drive motor (not shown), and the pressure belt 62 is rotated in a direction opposite to the rotation direction of the heating roller 61 while following the rotation of the heating roller 61.

A sheet K (recording medium) including an unfixed toner image is guided by a fixing entrance guide 56 and is transported to the nip region N. Then, in a case where the sheet K passes through the nip region N, the toner image on the sheet K is fixed by pressure and heat acting on the nip region N.

Fixing Device According to Second Exemplary Embodiment

A fixing device 80 according to a second exemplary embodiment will be described with reference to FIG. 6.

FIG. 6 is a schematic diagram showing the configuration of the fixing device 80 according to the second exemplary embodiment.

The fixing device 80 includes a pressure roller 88 (an example of the first rotating body) and a fixing belt module 86.

The fixing belt module 86 includes a heating belt 84 (an example of the second rotating body), a pressing pad 87 (an example of the pressing member), a sliding member 82 (an example of the sliding member according to the present exemplary embodiment), and a halogen heater 89A (an example of the heating source) that is provided near the pressing pad 87.

The fixing belt module 86 further includes a support roller 90, a support roller 92, a posture correction roller 94, and a support roller 98.

The pressure roller 88 is disposed to be pressed against the heating belt 84 (fixing belt module 86), and a nip region N (nip portion) is formed in a region where the pressure roller 88 and the heating belt 84 (fixing belt module 86) are in contact with each other.

The heating belt 84 is formed to have an endless shape, and is rotatably supported by the pressing pad 87 and the support roller 90 that are disposed in the heating belt 84.

The heating belt 84 is wound around the pressing pad 87, and the pressing pad 87 presses the heating belt 84 against the pressure roller 88.

The pressing pad 87 includes a front nip member 87*a* and a peeling nip member 87*b*, and is supported by a holding member 89.

The front nip member 87*a* is formed in a concave shape corresponding to the outer peripheral shape of the pressure roller 88, is disposed on the entrance side of the nip region N, and ensures the length (a distance in the sliding direction) of the nip region N.

The peeling nip member 87*b* is formed to protrude toward the outer peripheral surface of the pressure roller 88, and causes local strain on the pressure roller 88 in an exit region of the nip region N to facilitate the peeling of a recording medium to which an image is fixed from the pressure roller 88.

The pressing pad 87 includes a halogen heater 89A (an example of the heating source) near the pressing pad 87 (for example, in the holding member 89), and heats the heating belt 84 from the inner peripheral surface side of the heating belt 84.

For example, a lubricant supply device (not shown), which is means for supplying a lubricant to the inner peripheral surface of the heating belt 84, is mounted in the upstream of the front nip member 87*a* of the holding member 89.

The sliding member 82 is formed in a sheet shape, and is disposed between the heating belt 84 and the pressing pad 87 such that the sliding surface (a surface on which the recessed portions are scattered) of the sliding member 82 is in contact with the inner peripheral surface of the heating belt 84.

The sliding member 82 is involved in holding and providing a lubricant (for example, oil) present between the sliding surface of the sliding member 82 and the inner peripheral surface of the heating belt 84, and is also involved in pushing down the inner surface of the heating belt 84 in a case where the sliding member according to the present exemplary embodiment is applied. Since the sliding member 82 is excellent in sliding resistance maintainability, an increase in the life of the fixing device 80 is achieved.

The heating belt 84 is wound around the support roller 90, and the support roller 90 supports the heating belt 84 at a position different from the position of the pressing pad 87.

The support roller 90 includes a halogen heater 90A (an example of the heating source) therein, and heats the heating belt 84 from the inner peripheral surface side of the heating belt 84.

The support roller 90 is a roller in which a release layer made of a fluororesin and having a thickness of, for example, 20 μm is formed on the outer peripheral surface of a cylindrical roller made of, for example, aluminum.

The support roller 92 is disposed in contact with the outer peripheral surface of the heating belt 84 between the pressing pad 87 and the support roller 90, and defines a circumferential path of the heating belt 84.

The support roller 92 includes a halogen heater 92A (an example of the heating source) therein, and heats the heating belt 84 from the outer peripheral surface side of the heating belt 84.

The support roller 92 is a roller in which a release layer made of a fluororesin and having a thickness of, for example, 20 μm is formed on the outer peripheral surface of a cylindrical roller made of, for example, aluminum.

At least one of the halogen heater 89A, the halogen heater 90A, or the halogen heater 92A, which is an example of the heating source, may be provided.

The posture correction roller 94 is disposed in contact with the inner peripheral surface of the heating belt 84 between the support roller 90 and the pressing pad 87, and corrects the posture of the heating belt 84 between the support roller 90 and the pressing pad 87.

An end portion-position measurement mechanism (not shown), which measures the position of an end portion of the heating belt 84, is disposed near the posture correction roller 94, the posture correction roller 94 is provided with an axial displacement mechanism (not shown) that displaces the contact position of the heating belt 84 in an axial direction according to a measurement result of the end portion-position measurement mechanism, and these mechanisms correct the posture of the heating belt 84.

The posture correction roller 94 is a columnar roller made of, for example, aluminum.

The support roller 98 is disposed in contact with the inner peripheral surface of the heating belt 84 between the pressing pad 87 and the support roller 92, and applies tension to the heating belt 84 from the inner peripheral surface of the heating belt 84 on the downstream side of the nip region N.

The support roller 98 is a roller in which a release layer made of a fluororesin and having a thickness of, for example, 20 μm is formed on the outer peripheral surface of a cylindrical roller made of, for example, aluminum.

The pressure roller 88 is disposed to be pressed against the heating belt 84 at a portion of which the heating belt 84 is wound around the pressing pad 87.

Since the pressure roller 88 is rotatably provided, the pressure roller 88 is rotated in a direction of an arrow F while following the heating belt 84 as the heating belt 84 is rotationally moved in a direction of an arrow E.

The pressure roller 88 has a configuration in which an elastic layer 88B made of, for example, silicone rubber and a release layer (not shown) made of a fluororesin and having a thickness of, for example, 100 μm are laminated in this order on the outer peripheral surface of a columnar roller 88A made of, for example, aluminum.

For example, the support roller 90 or the support roller 92 is rotated by a drive motor (not shown), the heating belt 84 is rotationally rotated in the direction of the arrow E while following the rotation of the support roller 90 or the support roller 92, and the pressure roller 88 is rotated in the direction of the arrow F while following the rotational movement of the heating belt 84.

A sheet K (recording medium) including an unfixed toner image is transported to the nip region N of the fixing device 80. Then, in a case where the sheet K passes through the nip region N, the toner image on the sheet K is fixed by pressure and heat acting on the nip region N.

Image Forming Apparatus

An image forming apparatus according to the present exemplary embodiment includes an image holding body, a charging device that charges the surface of the image holding body, a latent image forming device that forms a latent image on the charged surface of the image holding body, a developing device that develops the latent image with toner to form a toner image, a transfer device that transfers the toner image onto a recording medium, and a fixing device that fixes the toner image to the recording medium. The fixing device is the fixing device according to the present exemplary embodiment.

The image forming apparatus according to the present exemplary embodiment will be described below using an electrophotographic image forming apparatus by way of example. The image forming apparatus according to the present exemplary embodiment is not limited to an electrophotographic image forming apparatus, and may be a publicly known image forming apparatus (for example, an inkjet recording apparatus including an endless belt for transporting a sheet, or the like) other than an electrophotographic image forming apparatus. Further, in the image forming apparatus according to the present exemplary embodiment, for example, a part including at least the fixing device may have a cartridge structure (process cartridge) attached to and detached from the image forming apparatus.

The image forming apparatus according to the present exemplary embodiment will be described with reference to FIG. 7.

FIG. 7 is a schematic diagram showing the configuration of the image forming apparatus 100 according to the present exemplary embodiment. The image forming apparatus 100 includes the already-described fixing device 60 according to the first exemplary embodiment. The image forming apparatus 100 may include the already-described fixing device 80 according to the second exemplary embodiment instead of the fixing device 60.

The image forming apparatus 100 is generally an intermediate transfer image forming apparatus called a tandem-type image forming apparatus. The image forming apparatus 100 includes image forming units 1Y, 1M, 1C, and 1K in which toner images having the respective colors are formed by an electrophotographic method, primary transfer units 10 that sequentially transfer (primarily transfer) the toner images having the respective colors onto an intermediate transfer belt 15, a secondary transfer unit 20 that collectively transfers (secondarily transfers) superimposed toner images transferred onto the intermediate transfer belt 15 to a sheet K, which is a recording medium, the fixing device 60 that fixes the secondarily transferred images onto the sheet K, and a controller 30 that controls the operation of each device (each unit).

The image forming units 1Y, 1M, 1C, and 1K are substantially linearly arranged in the order of 1Y (unit for yellow), 1M (unit for magenta), 1C (unit for cyan), 1K (unit for black) from the upstream side of the intermediate transfer belt 15.

Each of the image forming units 1Y, 1M, 1C, and 1K includes a photoreceptor 11 (an example of the image holding body). The photoreceptor 11 is rotated in a direction of an arrow G.

A charging unit 12 (an example of a charging device), a laser exposure unit 13 (an example of a latent image forming device), a developing unit 14 (an example of a developing device), a primary transfer roller 16, and a photoreceptor cleaner 17 are sequentially arranged around the photoreceptor 11 in a rotation direction of the photoreceptor 11.

The charging unit 12 charges the surface of the photoreceptor 11.

The laser exposure unit 13 emits an exposure beam Bm to form an electrostatic latent image on the photoreceptor 11.

The developing unit 14 stores toner having each color, and changes the electrostatic latent image formed on the photoreceptor 11 into a visible image with the toner.

The primary transfer roller 16 transfers the toner image formed on the photoreceptor 11 onto the intermediate transfer belt 15 at the primary transfer unit 10.

The photoreceptor cleaner 17 removes residual toner remaining on the photoreceptor 11.

The intermediate transfer belt 15 is a belt made of a material in which an antistatic agent, such as carbon black, is added to a resin, such as polyimide or polyamide. The intermediate transfer belt 15 has a volume resistivity of, for example, $10^6$ Ωcm or more and $10^{14}$ Ωcm or less and has a thickness of, for example, 0.1 mm.

The intermediate transfer belt 15 is supported by a drive roller 31, a support roller 32, a tension applying roller 33, a back roller 25, and a cleaning back roller 34, and is driven to circulate (is rotated) in a direction of an arrow H according to the rotation of the drive roller 31.

The drive roller 31 is driven by a motor (not shown) excellent in constant speed property and rotates the intermediate transfer belt 15.

The support roller 32 supports the intermediate transfer belt 15, which substantially linearly extends in an arrangement direction of four photoreceptors 11, together with the drive roller 31.

The tension applying roller 33 applies constant tension to the intermediate transfer belt 15, and functions as a correction roller that suppresses the meandering of the intermediate transfer belt 15.

The back roller 25 is provided in the secondary transfer unit 20, and the cleaning back roller 34 is provided in the cleaning unit that scrapes off residual toner remaining on the intermediate transfer belt 15.

The primary transfer roller 16 is disposed in pressure contact with the photoreceptor 11 with the intermediate transfer belt 15 interposed between the photoreceptor 11 and the primary transfer roller 16, and forms the primary transfer unit 10.

A voltage (primary transfer bias) having a polarity opposite to the charging polarity of the toner (referred to as a negative polarity. The same applies hereinafter.) is applied to the primary transfer roller 16. Accordingly, the toner images formed on the respective photoreceptors 11 are sequentially electrostatically attracted to the intermediate transfer belt 15, so that the superimposed toner images are formed on the intermediate transfer belt 15.

The primary transfer roller 16 is a cylindrical roller that includes a shaft (for example, a columnar rod made of metal, such as iron or SUS) and an elastic layer (for example, a sponge layer made of blended rubber with which a conductive agent, such as carbon black, is blended) fixed around the shaft. The primary transfer roller 16 has a volume resistivity of, for example, $10^{7.5}$ Ωcm or more and $10^{8.5}$ Ωcm or less.

The secondary transfer roller 22 is disposed in pressure contact with the back roller 25 with the intermediate transfer belt 15 interposed between the back roller 25 and the secondary transfer roller 22, and forms the secondary transfer unit 20.

The secondary transfer roller 22 forms a secondary transfer bias between the back roller 25 and the secondary transfer roller 22, and secondarily transfers the toner images onto the sheet K (recording medium) transported to the secondary transfer unit 20.

The secondary transfer roller 22 is a cylindrical roller that includes a shaft (for example, a columnar rod made of metal, such as iron or SUS) and an elastic layer (for example, a sponge layer made of blended rubber with which a conductive agent, such as carbon black, is blended) fixed around the shaft. The secondary transfer roller 22 has a volume resistivity of, for example, $10^{7.5}$ Ωcm or more and $10^{8.5}$ Ωcm or less.

The back roller 25 is disposed on the back side of the intermediate transfer belt 15 to form a counter electrode of the secondary transfer roller 22, and forms a transfer electric field between the secondary transfer roller 22 and the back roller 25.

For example, a rubber substrate is coated with a tube made of blended rubber in which carbon is dispersed, so that the back roller 25 is formed. The back roller 25 has a surface resistivity of, for example, $10^7$Ω/□ or more and $10^{10}$Ω/□ or less, and has a hardness of, for example, 70° (Asker C manufactured by Kobunshi Keiki Co., Ltd., The same applies hereinafter).

A power feed roller 26 made of metal is disposed in contact with the back roller 25. The power feed roller 26 applies a voltage (secondary transfer bias) having a polarity identical to the charging polarity of the toner (negative polarity) to form a transfer electric field between the secondary transfer roller 22 and the back roller 25.

An intermediate transfer belt cleaner 35 is provided on the downstream side of the secondary transfer unit 20 of the intermediate transfer belt 15 to be freely attachable to and detachable from the intermediate transfer belt 15. The intermediate transfer belt cleaner 35 removes residual toner and paper dust on the intermediate transfer belt 15 after the secondary transfer.

A reference sensor (home position sensor) 45 is provided on the upstream side of the image forming unit 1Y. The reference sensor 45 generates a reference signal that serves as a reference used to take an image formation timing in each image forming unit. The reference sensor 45 recognizes a mark provided on the back side of the intermediate transfer belt 15 and generates a reference signal, and the image forming units 1Y, 1M, 1C, and 1K start to form image according to an instruction given from the controller 30 that recognizes this reference signal.

An image density sensor 47 used to adjust image quality is provided on the downstream side of the image forming unit 1K.

The image forming apparatus 100 includes a sheet storage part 50, a sheet feed roller 51, transport rollers 52, a transport guide 53, a transport belt 55, and a fixing entrance guide 56 as transport means for transporting a sheet K.

The sheet storage part 50 stores sheets K on which images are not yet formed.

The sheet feed roller 51 takes out a sheet K stored in the sheet storage part 50.

The transport rollers 52 transports the sheet K that is taken out by the sheet feed roller 51.

The transport guide 53 sends the sheet K, which is transported by the transport rollers 52, to the secondary transfer unit 20.

The transport belt 55 transports the sheet K, to which images are transferred at the secondary transfer unit 20, to the fixing device 60.

The fixing entrance guide 56 guides the sheet K to the fixing device 60.

Next, a method of forming an image using the image forming apparatus 100 will be described.

In the image forming apparatus 100, image data output from an image reading device (not shown), a computer (not shown), or the like are subjected to image processing via an image processing device (not shown) and work for forming images is performed by the image forming units 1Y, 1M, 1C, and 1K.

In the image processing device, image processing, such as shading correction, misregistration correction, brightness/color space conversion, gamma correction, frame removal or color editing, and movement editing, is performed on input reflectance data. Image data on which the image processing is performed are converted into coloring material gradation data of four colors, that is, Y, M, C, and K, and are output to the laser exposure units 13.

The laser exposure unit 13 irradiates each of the photoreceptors 11 of the image forming units 1Y, 1M, 1C, and 1K with an exposure beam Bm according to the input coloring material gradation data.

The surface of each of the photoreceptors 11 of the image forming units 1Y, 1M, 1C, and 1K is charged by the charging unit 12 and is then scanned and exposed by the laser exposure unit 13, so that an electrostatic latent image is formed. The electrostatic latent image formed on each photoreceptor 11 is developed as a toner image having each color by each image forming unit.

The toner image formed on each of the photoreceptors 11 of the image forming units 1Y, 1M, 1C, and 1K is transferred onto the intermediate transfer belt 15 at the primary transfer unit where each photoreceptor 11 and the intermediate transfer belt 15 are in contact with each other. At the primary transfer units 10, a voltage (primary transfer bias) having a polarity opposite to the charging polarity of the toner (negative polarity) is applied to the intermediate transfer belt 15 by the primary transfer rollers 16 and toner images are sequentially superimposed and transferred onto the intermediate transfer belt 15.

The toner images primarily transferred onto the intermediate transfer belt 15 are transported to the secondary transfer unit 20 with the movement of the intermediate transfer belt 15.

At a time when the toner images reach the secondary transfer unit 20, a sheet K stored in the sheet storage part 50 is transported by the sheet feed roller 51, the transport rollers 52, and the transport guide 53, is fed to the secondary transfer unit 20, and is sandwiched between the intermediate transfer belt 15 and the secondary transfer roller 22.

Then, the toner images on the intermediate transfer belt 15 are electrostatically transferred (secondarily transferred) onto the sheet K at the secondary transfer unit 20 where a transfer electric field is formed.

The sheet K onto which the toner images are electrostatically transferred is peeled off from the intermediate transfer belt 15 by the secondary transfer roller 22 and is transported to the fixing device 60 by the transport belt 55.

The sheet K transported to the fixing device 60 is heated and pressed by the fixing device 60, so that the unfixed toner images are fixed.

An image is formed on the recording medium by the image forming apparatus 100 through the above-mentioned steps.

Examples

Examples of the present invention will be described below, but the present invention is not limited to the following examples. In the following description, unless otherwise specified, all of "parts" and "%" are based on mass.

Example 1

Production of Sliding Sheet (S1)

Extrusion molding is performed using a poly ether ether ketone (PEEK) resin to obtain a PEEK resin film (a thickness of 200 μm).

Subsequently, a plurality of recessed portions having the shape and arrangement shown in FIG. 1 are formed on the obtained resin film.

The obtained resin layer including the plurality of recessed portions is defined as a sliding sheet (S1).

Examples 2 to 12

Production of Sliding Sheets (S2) to (S12)

Sliding sheets (S2) to (S12) are obtained in the same manner as the production of the sliding sheet (S1) except that recessed portions having tip angles θ, area ratios, shapes, sizes, depths, and arrangements shown in Table 1 are formed by a hot press.

FIG. 8 is a schematic diagram showing the shapes and tip angles of the recessed portions formed on the sliding sheets (S2) to (S4) of Examples 2 to 4.

Comparative Examples 1 to 4

Production of Sliding Sheets (CS1) to (CS4)

Sliding sheets (CS1) to (CS4) are obtained in the same manner as the production of the sliding sheet (S1) except that recessed portions having tip angles θ, area ratios, shapes, sizes, depths, and arrangements shown in Table 1 are formed by a hot press.

bright room, and is compared with a comparative sample to check the presence or absence of gloss unevenness and the degree of occurrence of gloss unevenness.

A: Gloss unevenness is hardly observed.

B: Gloss unevenness is not observed at a glance, but gloss unevenness is observed in a case where a surface on which the image is formed is reflected to a light source.

C: Gloss unevenness is observed at a glance.

TABLE 1

| | Sliding sheet and formed recessed portion | | | | | | | Performance evaluation | |
|---|---|---|---|---|---|---|---|---|---|
| | Type | Tip angle θ [°] | Area ratio [%] | Shape No. | Size Maximum diameter [μm] | Depth [μm] | Arrangement | Sliding resistance maintainability | Gloss unevenness |
| Example 1 | (S1) | 60 | 60 | b | 250 | 25 | Linear arrangement (FIG. 1) | 950,000 pieces | B |
| Example 2 | (S2) | 45 | 60 | b | 250 | 25 | Aperiodic (FIG. 2) | 1,300,000 pieces | A |
| Example 3 | (S3) | 60 | 60 | b | 250 | 25 | Aperiodic (FIG. 2) | 1,500,000 pieces | A |
| Example 4 | (S4) | 75 | 60 | b | 250 | 25 | Aperiodic (FIG. 2) | 1,450,000 pieces | A |
| Example 5 | (S5) | 60 | 60 | b | 250 | 25 | Grid shape (FIG. 3) | 800,000 pieces | C |
| Example 6 | (S6) | 85 | 60 | b | 250 | 25 | Aperiodic (FIG. 2) | 1,000,000 pieces | A |
| Example 7 | (S7) | 35 | 60 | b | 250 | 25 | Aperiodic (FIG. 2) | 900,000 pieces | A |
| Example 8 | (S8) | 60 | 60 | b | 250 | 10 | Aperiodic (FIG. 2) | 900,000 pieces | A |
| Example 9 | (S9) | 60 | 45 | b | 250 | 25 | Aperiodic (FIG. 2) | 850,000 pieces | A |
| Example 10 | (S10) | 60 | 50 | b | 250 | 25 | Aperiodic (FIG. 2) | 1,050,000 pieces | A |
| Example 11 | (S11) | 60 | 65 | b | 250 | 25 | Aperiodic (FIG. 2) | 1,450,000 pieces | A |
| Example 12 | (S12) | 60 | 60 | c | 250 | 25 | Aperiodic (FIG. 2) | 1,500,000 pieces | A |
| Comparative Example 1 | (CS1) | 90 | 60 | b | 250 | 25 | Linear arrangement (FIG. 1) | 700,000 pieces | B |
| Comparative Example 2 | (CS2) | 120 | 60 | b | 250 | 25 | Linear arrangement (FIG. 1) | 650,000 pieces | B |
| Comparative Example 3 | (CS3) | 180 | 60 | b | 250 | 25 | Linear arrangement (FIG. 1) | 400,000 pieces | B |
| Comparative Example 4 | (CS4) | 60 | 75 | b | 250 | 25 | Linear arrangement (FIG. 1) | 500,000 pieces | B |

FIG. 8 is a schematic diagram showing the shapes and tip angles of the recessed portions formed on the sliding sheets (CS1) to (CS3) of Comparative Example 1 to 3.

Evaluation Method

Evaluation of Sliding Resistance Maintainability

The obtained sliding sheet is incorporated into a fixing device of an image forming apparatus (ApeosPort-VI C7771) manufactured by FUJIFILM Business Innovation Corp. Further, a lubricant used in the fixing device is silicone oil (viscosity at a temperature of 150° C.: 40 $mm^2/s$).

Continuous sheet passing is performed by this image forming apparatus, and the drive torque of the fixing device at that time is measured. The sliding resistance maintainability of the sliding member is evaluated on the basis of the number of passed sheets when the drive torque reached 0.7 N·m that is an upper limit of torque. A larger number of passed sheets indicates better sliding resistance maintainability, and it is desirable that the number of passed sheets (life) is, for example, 1,000,000 or more.

Evaluation of Gloss Unevenness

The obtained sliding sheet is incorporated into a fixing device of an image forming apparatus (ApeosPort-VI C7771) manufactured by FUJIFILM Business Innovation Corp. Here, a lubricant used in the fixing device is also silicone oil (viscosity at a temperature of 150° C.: 40 $mm^2/s$).

With this image forming apparatus, 100 solid black images are printed on OK TOP coated paper (manufactured by Oji Paper Co., Ltd., a basis weight of 127.9 $g/m^2$). The image of the 100th printed matter is visually observed from a distance of about 30 cm from the image in a sufficiently From the results shown in Table 1, it is found that the sliding members of Examples are more excellent in sliding resistance maintainability than the sliding members of Comparative Examples.

Further, it is found that gloss unevenness is reduced in a case where the arrangement of the plurality of recessed portions is aperiodic.

(1) A sliding member for a fixing device comprising:

a resin layer that includes a plurality of recessed portions on a surface of the resin layer, wherein, in a top view, the recessed portion has a shape having a tip angle less than 90° in a sliding direction and an area ratio of an area of the recessed portions to a surface area of the resin layer is 30% or more and 70% or less.

(2) The sliding member for a fixing device according to (1), wherein the tip angle is 80° or less.

(3) The sliding member for a fixing device according to (1) or (2), wherein the tip angle is 40° or more.

(4) The sliding member for a fixing device according to any one of (1) to (3), wherein a depth of the recessed portion is 15 μm or more.

(5) The sliding member for a fixing device according to any one of (1) to (4), wherein the area ratio is 50% or more and 70% or less.

(6) The sliding member for a fixing device according to any one of (1) to (5), wherein the tip angle is 40° or more and 80° or less, and a depth of the recessed portion is 15 μm or more.

(7) The sliding member for a fixing device according to any one of (1) to (6), wherein the tip angle is 40° or more and 80° or less, and the area ratio is 50% or more and 70% or less.

(8) The sliding member for a fixing device according to any one of (1) to (7), wherein a depth of the recessed portion is 15 μm or more, and the area ratio is 50% or more and 70% or less.

(9) The sliding member for a fixing device according to any one of (1) to (8), wherein at least a part of the plurality of recessed portions are linearly arranged in the sliding direction.

(10) The sliding member for a fixing device according to any one of (1) to (9), wherein the plurality of recessed portions are present aperiodically.

(11) A fixing device including:

a first rotating body;

a second rotating body that is disposed in contact with an outer surface of the first rotating body;

a pressing member that is disposed in the second rotating body and presses the second rotating body against the first rotating body from an inner surface of the second rotating body;

the sliding member for a fixing device according to any one of (1) to (10) that is interposed between an inner surface of the second rotating body and the pressing member; and a lubricant that is interposed between an inner periphery of the second rotating body and the sliding member for a fixing device, wherein a recording medium in which a toner image is formed on a surface is inserted into a contact portion between the first rotating body and the second rotating body and the toner image is fixed.

(12) The fixing device according to (11), wherein a viscosity of the lubricant at a temperature of 150° C. is 1 $mm^2/s$ or more and 100 $mm^2/s$ or less.

(13) An image forming apparatus including:

an image holding body;

a charging unit that charges a surface of the image holding body;

an electrostatic latent image forming unit that forms an electrostatic latent image on the charged surface of the image holding body;

a developing unit that develops the electrostatic latent image formed on the surface of the image holding body with a developer containing toner to form a toner image;

a transfer unit that transfers the toner image onto a surface of a recording medium; and a fixing unit that is formed of the fixing device according to (11) or (12) and fixes the toner image to the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A sliding member for a fixing device comprising:

a resin layer that includes a plurality of recessed portions on a surface of the resin layer, wherein, in a top view, each of the recessed portion of the plurality of recessed portions has a shape having a tip in a sliding direction where a first side and a second side of the recessed portion converges at the tip as the tip angle between the first side and the second side is less than 90° and an area ratio between areas of all the recessed portions to an entire surface area of a side corresponding to the top view of the resin layer is 30% or more and 70% or less.

2. The sliding member for a fixing device according to claim 1, wherein the tip angle is 80° or less.

3. The sliding member for a fixing device according to claim 2, wherein the tip angle is 40° or more.

4. A fixing device comprising:

a first rotating body;

a second rotating body that is disposed in contact with an outer surface of the first rotating body;

a pressing member that is disposed in the second rotating body and presses the second rotating body against the first rotating body from an inner surface of the second rotating body;

the sliding member for a fixing device according to claim 3 that is interposed between an inner surface of the second rotating body and the pressing member; and a lubricant that is interposed between an inner periphery of the second rotating body and the sliding member for a fixing device, wherein a recording medium in which a toner image is formed on a surface is inserted into a contact portion between the first rotating body and the second rotating body and the toner image is fixed.

5. A fixing device comprising:

a first rotating body;

a second rotating body that is disposed in contact with an outer surface of the first rotating body;

a pressing member that is disposed in the second rotating body and presses the second rotating body against the first rotating body from an inner surface of the second rotating body;

the sliding member for a fixing device according to claim 2 that is interposed between an inner surface of the second rotating body and the pressing member; and a lubricant that is interposed between an inner periphery of the second rotating body and the sliding member for a fixing device, wherein a recording medium in which a toner image is formed on a surface is inserted into a contact portion between the first rotating body and the second rotating body and the toner image is fixed.

6. The sliding member for a fixing device according to claim 1, wherein a depth of the recessed portion is 15 μm or more.

7. A fixing device comprising:

a first rotating body;

a second rotating body that is disposed in contact with an outer surface of the first rotating body;

a pressing member that is disposed in the second rotating body and presses the second rotating body against the first rotating body from an inner surface of the second rotating body;

the sliding member for a fixing device according to claim 4 that is interposed between an inner surface of the second rotating body and the pressing member; and a lubricant that is interposed between an inner periphery of the second rotating body and the sliding member for a fixing device, wherein a recording medium in which a toner image is formed on a surface is inserted into a contact portion between the first rotating body and the second rotating body and the toner image is fixed.

8. The sliding member for a fixing device according to claim 1, wherein the area ratio is 50% or more and 70% or less.

9. A fixing device comprising:

a first rotating body;

a second rotating body that is disposed in contact with an outer surface of the first rotating body;

a pressing member that is disposed in the second rotating body and presses the second rotating body against the first rotating body from an inner surface of the second rotating body;

the sliding member for a fixing device according to claim 5 that is interposed between an inner surface of the second rotating body and the pressing member; and a lubricant that is interposed between an inner periphery of the second rotating body and the sliding member for a fixing device, wherein a recording medium in which a toner image is formed on a surface is inserted into a contact portion between the first rotating body and the second rotating body and the toner image is fixed.

10. The sliding member for a fixing device according to claim 1, wherein the tip angle is 40° or more and 80° or less, and a depth of the recessed portion is 15 μm or more.

11. A fixing device comprising:

a first rotating body;

a second rotating body that is disposed in contact with an outer surface of the first rotating body;

a pressing member that is disposed in the second rotating body and presses the second rotating body against the first rotating body from an inner surface of the second rotating body;

the sliding member for a fixing device according to claim 6 that is interposed between an inner surface of the second rotating body and the pressing member; and a lubricant that is interposed between an inner periphery of the second rotating body and the sliding member for a fixing device, wherein a recording medium in which a toner image is formed on a surface is inserted into a contact portion between the first rotating body and the second rotating body and the toner image is fixed.

12. The sliding member for a fixing device according to claim 1, wherein the tip angle is 40° or more and 80° or less, and the area ratio is 50% or more and 70% or less.

13. A fixing device comprising:

a first rotating body;

a second rotating body that is disposed in contact with an outer surface of the first rotating body;

a pressing member that is disposed in the second rotating body and presses the second rotating body against the first rotating body from an inner surface of the second rotating body;

the sliding member for a fixing device according to claim 7 that is interposed between an inner surface of the second rotating body and the pressing member; and a lubricant that is interposed between an inner periphery of the second rotating body and the sliding member for a fixing device, wherein a recording medium in which a toner image is formed on a surface is inserted into a contact portion between the first rotating body and the second rotating body and the toner image is fixed.

14. The sliding member for a fixing device according to claim 1, wherein a depth of the recessed portion is 15 μm or more, and the area ratio is 50% or more and 70% or less.

15. A fixing device comprising:

a first rotating body;

a second rotating body that is disposed in contact with an outer surface of the first rotating body;

a pressing member that is disposed in the second rotating body and presses the second rotating body against the first rotating body from an inner surface of the second rotating body;

the sliding member for a fixing device according to claim 8 that is interposed between an inner surface of the second rotating body and the pressing member; and a lubricant that is interposed between an inner periphery of the second rotating body and the sliding member for a fixing device, wherein a recording medium in which a toner image is formed on a surface is inserted into a contact portion between the first rotating body and the second rotating body and the toner image is fixed.

16. The sliding member for a fixing device according to claim 1, wherein the plurality of recessed portions are linearly arranged in the sliding direction.

17. The sliding member for a fixing device according to claim 1, wherein the plurality of recessed portions are present aperiodically.

18. A fixing device comprising:

a first rotating body;

a second rotating body that is disposed in contact with an outer surface of the first rotating body;

a pressing member that is disposed in the second rotating body and presses the second rotating body against the first rotating body from an inner surface of the second rotating body;

the sliding member for a fixing device according to claim 1 that is interposed between an inner surface of the second rotating body and the pressing member; and a lubricant that is interposed between an inner periphery of the second rotating body and the sliding member for a fixing device, wherein a recording medium in which a toner image is formed on a surface is inserted into a contact portion between the first rotating body and the second rotating body and the toner image is fixed.

19. The fixing device according to claim 18, wherein a viscosity of the lubricant at a temperature of 150° C. is 1 mm2/s or more and 100 mm2/s or less.

20. An image forming apparatus comprising:

an image holding body;

a charging unit that charges a surface of the image holding body;

an electrostatic latent image forming unit that forms an electrostatic latent image on the charged surface of the image holding body;

a developing unit that develops the electrostatic latent image formed on the surface of the image holding body with a developer containing toner to form a toner image;

a transfer unit that transfers the toner image onto a surface of a recording medium; and a fixing unit that is formed of the fixing device according to claim 11 and fixes the toner image to the recording medium.

* * * * *